United States Patent [19]
Budahn

[11] 3,797,980
[45] Mar. 19, 1974

[54] CHEESE MOLD WITH HINGED SIDE WALLS

[76] Inventor: Burnell E. Budahn, Norwood, Minn. 55368

[22] Filed: Jan. 21, 1972

[21] Appl. No.: 219,777

[52] U.S. Cl. .................................. 425/84, 249/172
[51] Int. Cl. ............................................ A01j 25/13
[58] Field of Search ............... 425/84; 249/113, 172

[56] References Cited
UNITED STATES PATENTS

| | | | |
|---|---|---|---|
| 428,792 | 5/1890 | Willey | 249/172 |
| 2,576,153 | 11/1951 | Tannenberg | 249/172 X |
| 3,118,229 | 1/1964 | Rossen | 425/84 |
| 3,514,857 | 6/1970 | Rossen | 425/84 |

*Primary Examiner*—Robert D. Baldwin
*Attorney, Agent, or Firm*—Schroeder, Siegfried, Ryan & Vidas

[57] ABSTRACT

A cheese mold is provided having side and end walls pivotally joined to a bottom member with a pressing member providing closure of the mold. The bottom, pressing member, side and end walls each have plate members with raised projections on their inner facing surfaces that space a flat inner perforated member from each of the plates, thereby facilitating drainage of whey from the cheese. A construction which provides for stable stacking of molds is achieved.

7 Claims, 6 Drawing Figures

PATENTED MAR 19 1974 3,797,980

CHEESE MOLD WITH HINGED SIDE WALLS

My invention is directed to molds for cheeses and is more specifically directed to a mold which will facilitate separation of the whey from the cheese and greatly facilitate removal of the cheese from the mold. The cheese mold in accordance with my invention incorporates constructional features which provide marked improvement both in its ruggedness and in its ease of use over those of the prior art. The mold of the invention is advantageous because of its ready release of the pressed cheese from the mold without damage to the surface portions thereof. Further, the cheese mold in accordance with my invention has a construction which permits a ready stacking of one cheese mold onto the upper surface of the pressing plate of another mold so as to provide both a stacking for economy of space which is stable as well as to utilize the weight of the cheese and molds as a means for bringing about the compression necessary to separate the whey from the cheese.

IN THE DRAWINGS

A cheese mold in accordance with my invention readily opens to a configuration wherein the cheese block created during the whey separation is readily removed. Because of the pivotal nature of the wall portions of the mold the cheese stands free and accessible to the operator upon pivoting of the walls away from the cheese block. The exterior surface of the formed cheese is flat and without any significant protusions or pits therein due to the flat surface of the perforated members defining the inner faces of the mold. As the inner faces of the mold, which are defined by the perforated members, are essentially smooth there is a marked reduction in chunk removal from the faces of the cheese due to cheese clinging to the mold members. Also due to the construction features of the mold cleaning of the mold is simplified over that of prior art molds.

In the designing of a cheese mold meeting the above advantages it has been my intention to provide a mold which is sufficiently rugged that it can be expected to readily withstand the normal handling encountered in production of cheese as well as to provide a mold which is essentially self-contained and has as few parts as possible in its actual finished form so as to minimize the need for handling of extraneous pieces of equipment. The finished mold should, of course, be as light as is possible commensurate with the strngth requirements to permit ready handling of the mold by process personnel.

Figure 1:
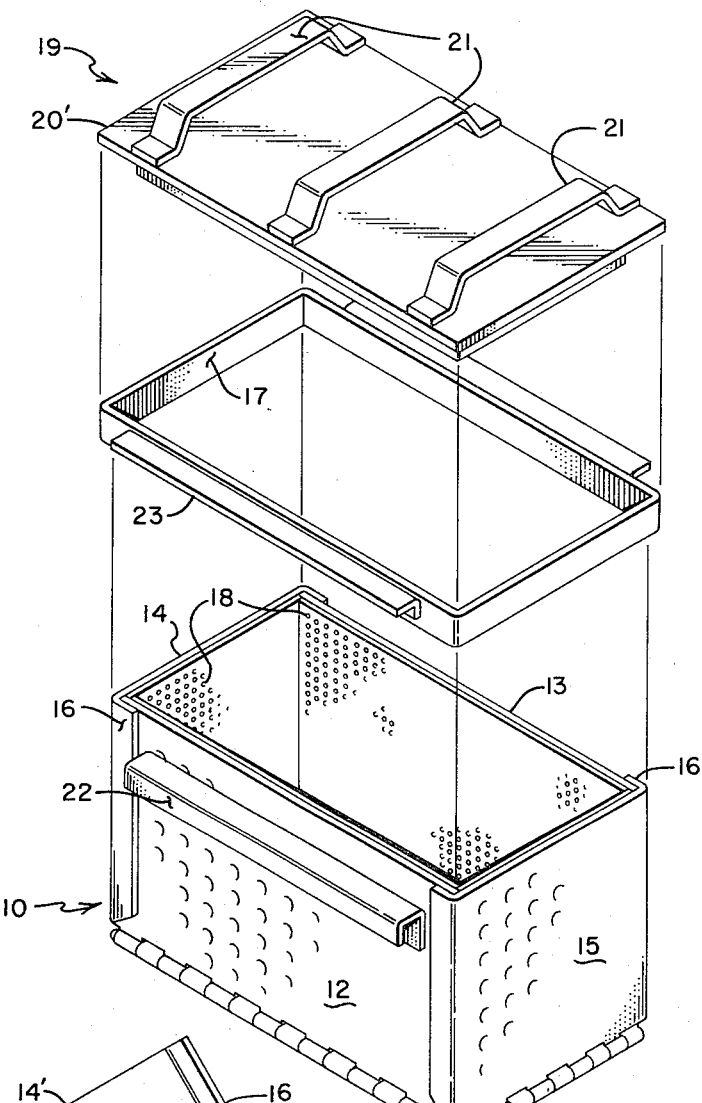
FIG. 1 is a perspective and partially exploded view of a cheese mold in accordance with the invention.
Figure 1A:
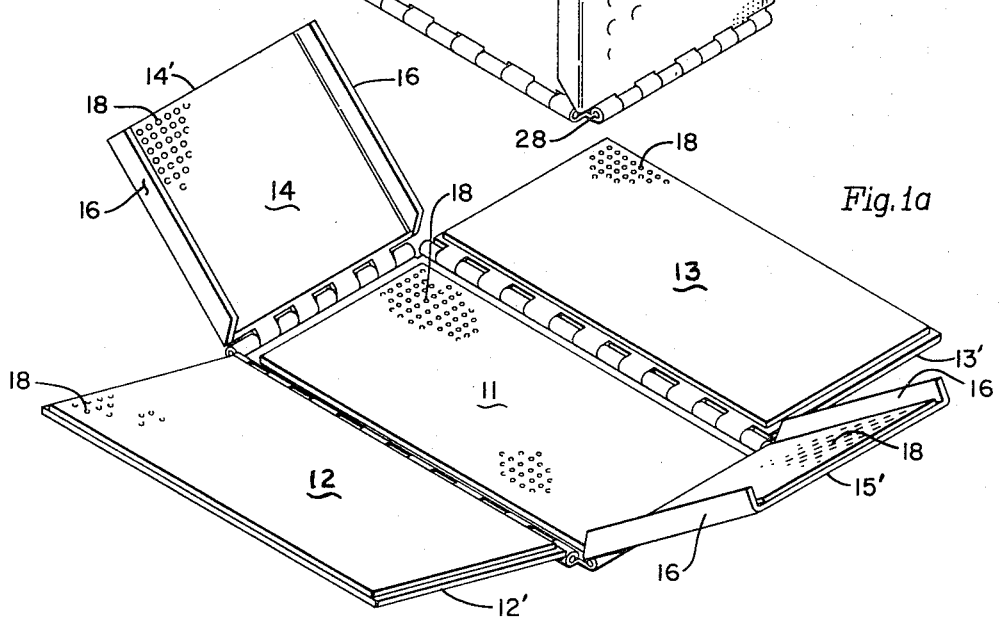
FIG. 1a is a perspective view of the major portions of the mold of FIG. 1 in the open condition.

Turning to the drawings it should be understood that in each of the drawings identical parts will be given the same numerical designation. Referring first to FIG. 1 there is illustrated in perspective and partially exploded view a cheese mold in accordance with the invention. In FIG. 1a the bottom and side wall portions of the mold of FIG. 1 are shown in the open position. The cheese mold generally designated 10 is constructed from a rectangularly shaped bottom member 11 and a pair of opposing side walls 12 and 13 which are pivotally joined to the lateral edges of the bottom member. End wall members 14 and 15 are likewise joined to the lateral edges of the bottom 11 in a pivoting relationship. As illustrated in FIG. 1 the four wall portions pivot up to form a rectangular box-like member with flanges 16 of the end wall member acting to enclose the end portions of side walls 12 and 13 to aid in holding the assembly together. A ring member 17 of a size to slip about the outer edges of the upper end of the mold 10 is provided for holding the assembly in a closed position. Ring member 17 can be readily slipped on and off of the mold 10 as desired. A stop member, as will be described below, holds ring 17 at the upper region of the mold. A cover member generally designated 19 provides a closure and pressure applying member for the mold.

Each of the bottom, side and end walls and cover members are constructed in a similar manner. That is, each has a two-layer construction with the outer facing layer formed of a plate of metal such as stainless steel which has been treated to have a plurality of projections on the inwardly facing surface thereof. The projections act both as supports for the inner layer and spacing means to provide a drainage channel between the two layers. The outer plate members are designated 11', 12', 13', 14' and 20. The inner layer of each is a perforated thin sheet of a metal such as stainless steel and is attached as by spot welding to the outer plate member. Each inner member is substantially coextensive with its corresponding plate member so that when the mold is in the closed position as shown in FIG. 1 the inner perforated sheets define the surface of the mold. These perforated sheet members are somewhat schematically designated by a partial showing of a series of holes 18 and are more clearly illustrated in the typical cross-sectional showing of FIG. 2. Flange members 16 of the end walls are formed as an integral part of the outer plate member of the end walls.

As noted above a cover member generally designated 19 provides a closure member for mold 10 and likewise serves as a pressure plate for transmission of pressure to the combined cheese and whey. It is of a size to slide within the space defined by the side and end walls. This cover member is of substantially identical construction to that of the walls and bottom in that it has a relatively thick plate member 20' which has attached to the interior facing surface thereof a thin perforated sheet member which is utilized to permit the whey to drain out from the cheese. This will be discussed in greater detail with regard to FIG. 2.

Figure 2:
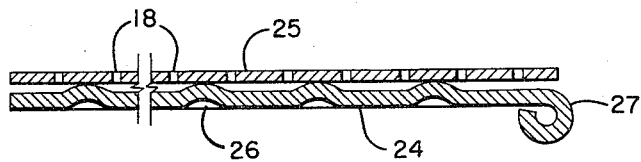
FIG. 2 is a cross-sectional view of a portion of a plate section and the attached perforated member assembly.

Referring now to FIG. 2 there is shown in cross-sectional view a portion of a plate and a perforated sheet member in accordance with the invention. The construction of each of bttom member 11, walls 12, 13, 14 and 15 and cover 19 will be essentially identical insofar as the relationship of the principal wall plate and the perforated sheet member. Thus, FIG. 2 is equally applicable to the general construction of each of these members.

A relatively thick outer wall member 24 of a material such as stainless steel has had attached thereto by means of spot welding a thin perforated sheet member 25 which is also advantageously made of stainless steel. I have found that the outer plate member 24 can be advantageously made up of a stainless steel sheet stock of about 1/16 inch thickness while the porous sheet 25 is desirable considerably thinner than this and may be advantageously made up in thicknesses of about 1/64 inch. It is desirable that plate 24 be of a minimum thickness commensurate with its requirements for strength both against the pressures involved in the pressing of the cheese and in its ability to withstand the normal handling it will undergo in use. Also, from a point of view of producing the projections which space sheet 25 from plate 24 it is simpler to provide such projections by mechanical means if plate 24 does not exceed a certain thickness. As to sheet 25 the thinner the sheet the simpler it is to produce the multiple numbers of holes necessary to permit the whey to drain readily therethrough. Sheet 25 acts as a porous member for drainage. Plate 24 and its projections provide the majority of the strength needed for support of plate 24 in the flat configuration. Therefore, one can use thicknesses less than those indicated. The holes 18 can be produced by a variety of means well known in the art. The diameter of holes 18 can vary although it is desirable that the holes have a diameter of less than 0.040 inch. The small holes permit the whey to drain and because of their small size leave only insignificant impressions on the finished cheese surface. The frequency of holes will depend to some extent somewhat upon the diameter of the holes but will desirably be about 100 holes per square inch.

The spacing between sheet 25 and plate 24 should be approximately 1/64 inch or greater both for drainage and for cleaning ease. The spacing is accomplished by producing mesa-like projections on the inner surface of plate 24. The preferred manner of producing projections is by mechanically deforming as by peening. The frequency of projections is such that there will be primarily empty space between sheet 25 and plate 24 but support points will exist on a spacing of about 3/8 inch from center to center of the projections. In the form illustrated in FIG. 2 I have provided the projection regions 26 by mechanically deforming plate 24 so as to provide raised regions on the inside surface of plate 24 and corresponding dents on the outside surface of plate 24. It will be recognized that when plate 24 surpasses certain thicknesses it will no longer readily respond to indentations on one surface for producing projections on the opposite surface. However, as one object of the present invention is maintaining the overall weight of the mold 10 as low as is feasible with recognition of strength requirements the preferred manner of producing projections is by mechanical deforming of plate 24. Alternatively, one can produce similar projections by means such as masking and chemical etching or sandblasting the inner surface of plate 24 so as to provide similar projecting points. However, such techniques are less desirable due to increased costs.

Cover member 19 is provided with a plurality of support members 21 which are attached as by welding at opposing edges of the plate 20 and extend transversely across. These support members 21 have the major portion of their lengths raised above the surface of plate 20 a distance corresponding to the amount of compression that the combined cheese and whey is anticipated to undergo during the compaction and drainage. The support members 21 are substantially flat across the great majority of their length as they span cover member 20. Thus, support members 21 provide the dual function of providing a plane defined by their upper flat portions for purposes which will be described and also provide a handling means for inserting and removing cover 19 from the mold cavity.

Referring again to FIG. 1 it will be seen that elongated handle members 22 are welded or otherwise attached to the outer surface of side walls 12 and 13. Members 22 provide a dual function of providing a gripping means for lifting and otherwise handling of the mold assembly and further provide a stop means for positioning ring 17 about the upper surface of the cheese mold. One advantage that my invention provides is the possibility of stacking a plurality of cheese molds directly above one another so as to be able to utilize the weight of succeeding cheese molds as a pressure means for squeezing the whey out of the cheese in lower containers. However, in order to be able to stack one cheese mold on top of the other it is necessary that there be only remote chance that one mold will slip within the cavity of a lower mold to bring about a tipping of the stack. By positioning ring 17 so that its upper edge is level with the upper edges of the walls and ends of mold 10 a somewhat broadened platform is provided which provides the dual function of increasing the resting surface so as to lessen the tendency to damage the relatively thin upper edges of the wall sections and also provide a broader base for resting of succeeding molds.

Figure 5:
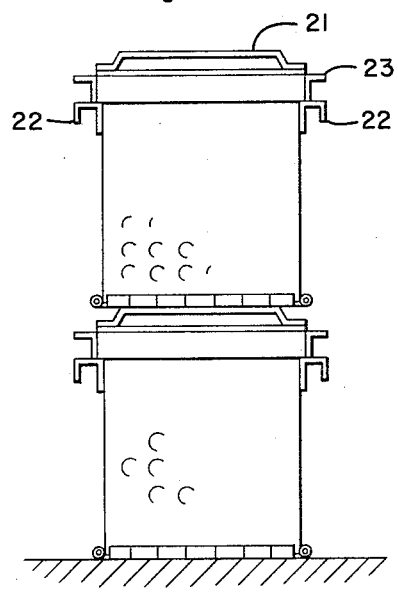
FIG. 5 is a side-elevational view of two molds in accordance with the invention in a stacked relationship.

It will be noted in connection with ring 17 that a grip 23 has been formed at the sides thereof so as to aid in lifting the ring on and off of the cheese mold assembly. It should also be noted that this grip member 23 projects outwardly from the side of the ring a distance such that it is essentially parallel to the outermost edges of handle 22. (See FIG. 5.) Thus when multiple stacks of cheese molds are arranged side by side the handle members 22 and grip 23 aid in lessening the tendency for tippage to take place. That is, even with the support members 21 providing a flat surface for succeeding cheese molds there is some possibility that due to differential settling of the cheese within mold 10 that some tipping of succeeding molds will tend to occur. By providing the handle and grip members in the manner shown, side by side stacks of cheese molds reinforce one another against tendency to tip.

Figure 4:
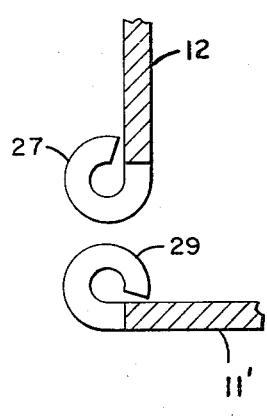
FIG. 4 is a side-elevational view of the hinge forming portions of a wall and bottom plate.
Figure 3:
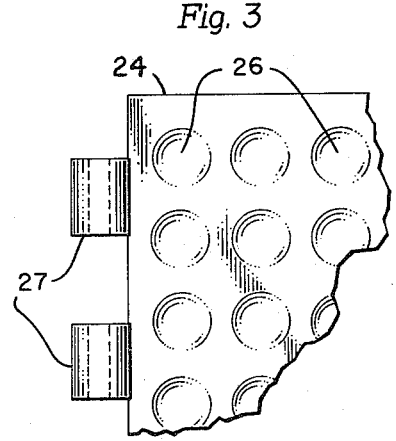
FIG. 3 is an elevational view of a corner portion of a plate member of the mold showing the hinge.

Turning now to FIGS. 2, 3 and 4 it will be seen that the outer plate members correspond to 11', 12', 13', 14' and 15' all have had the outer plate portion 24 formed at one edge thereof to produce a series of loops 27 at spaced intervals along the edges that are to be joined in a pivoting action. The spacing of loops 27 along the matching edges between the walls and the bottom member will be such as to permit interposing loops to form what is commonly referred to as a piano hinge. The hinge assembly is completed by means such as pin 28 to join the side walls in pivotal relationship to the bottom of the cheese mold.

In forming the piano hinge joining the side walls to the bottom I utilize a construction as most clearly illustrated in FIG. 4. In FIG. 4 bottom plate 11' has had the outer edges thereof curved to form a loop 29 in the manner illustrated therein. In exploded view is shown loop 27 of a wall portion such as wall 12 which likewise had a loop 27 formed therein for cooperative action with loop 29. As can be appreciated from a consideration of FIG. 4 the bottom plate 11' actually has an extension of its overall width and length provided by loop 29 so as to broaden the base portion thereof. This broadening of the base through the integral forming of the hinge in the manner shown provides a base region somewhat larger than that of the wall defined area of the mold. Thus, a mold will be less likely to slip within the cavity of an underlying cheese mold. Also the lower surface is free from projections so it can readily slide on tables and the like with less likelihood of catching upon any projections. The hinge region being essentially above the flat lowermost portion of bottom 11 is less likely to be damaged in handling and thus bring about binding action in the movement of the walls.

It should now be apparent that through use of a cheese mold constructed in accordance with my invention as described above one obtains a mold which can be readily opened to release the cheese that has been formed therein and because of the smooth facing and closely spaced perforations of the inner perforated member 25 has reduced tendencies for sticking of the cheese to the inner facing portions of cheese mold 10. The construction likewise is of lightweight construction and consists of a total of three separable sections so that it will be readily handleable in use. Due to the unique construction of the handle members on the lid and the spacing between the flat portions thereof and the lid proper a predetermined amount of compression of the cheese can be accomplished merely by stacking other cheese molds on top of one another rather than going through a prolonged period on a powered press. As considerable periods of time are involved in insuring that the whey is squeezed out of the cheese it is highly desirable that one does not unduly tie up press machinery in squeezing out the wehy.

I claim:

1. A cheese mold comprising:
   a. a rectangular box-like container having a rectangular bottom plate and a pair of opposed upstanding side walls plates and a pair of opposed upstanding end wall plates extending normal to and meeting said side walls at their ends;
   b. each of said side wall and said end wall plates being pivotally connected to lateral portions of said bottom plate and being swingable outwardly from vertically extending position away from each other;
   c. a rectangularly shaped pressing plate extending between the upper portions of said side and end walls and closing said container;
   d. the interiorly facing surface of each of said plates having a plurality of projections extending outwardly from the interiorly facing surface thereof;
   e. flat perforated liner members without projections fixedly joined to the interior surface of and of a size to be substantially coextensive with each of said bottom plate, said side and end walls and said pressing plate, each of said perforated liner members having a plane surface and being spaced from the surface of each of said respective plates by said projections, said projections providing the sole support means for said liner members, the intervening space between said liner members and said plates providing a plurality of drainage regions; and,
   f. rigid rectangularly shaped ring means removably encircling the upper portions of said container walls and holding the same in vertically extending relation against each other to cooperatively define said container.

2. A mold in accordance with claim 1 wherein said plate members are provided with indentations on the outwardly facing surfaces of said plates that project through said plates to form said projections.

3. A mold in accordance with claim 1 wherein each of the adjoining edges of plate members that pivot relative to one another are formed to a plurality of spaced loops which cooperatively are joined together by a pin to form a piano hinge.

4. A mold in accordance with claim 3 wherein the hinge forming loops of the base plate are above the plane defined by the lower surface of said base plate thereby enlarging the width and length of said base plate to a size greater than the opening defined by the upper edges of said side and end wall plates.

5. A mold in accordance with claim 1 wherein handle means extend outwardly from each of a pair of opposite wall members at the upper portions thereof and define a stop means for maintaining said ring means at the upper portions of said mold.

6. A mold in accordance with claim 5 wherein said handle means are positioned so that the upper edges of said ring means is on a plane with the upper edges of said walls thereby defining an enlarged resting surface for use in stacking a plurality of molds on top of one another.

7. A mold in accordance with claim 1 wherein said pressing plate includes a plurality of support members attached thereto on the outer side thereof, each of said support members comprising a bar with a U-shape the ends of which are joined to opposite edges of said plate, the portion of said support member intermediate the ends thereof being in raised relationship to said plate and defining with the other support members a generally flat plane parallel to the plane of said pressing plate.

* * * * *